United States Patent
Konrad et al.

(10) Patent No.: US 8,986,830 B2
(45) Date of Patent: Mar. 24, 2015

(54) SEALABLE BIAXIALLY ORIENTED POLYESTER FILM

(75) Inventors: Matthias Konrad, Kriftel (DE); Bodo Kuhmann, Runkel (DE); Gottfried Hilkert, Saulheim (DE); Herbert Peiffer, Mainz (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 463 days.

(21) Appl. No.: 13/062,706

(22) PCT Filed: Sep. 3, 2009

(86) PCT No.: PCT/EP2009/006385
§ 371 (c)(1),
(2), (4) Date: Mar. 8, 2011

(87) PCT Pub. No.: WO2010/028774
PCT Pub. Date: Mar. 18, 2010

(65) Prior Publication Data
US 2011/0171464 A1     Jul. 14, 2011

(30) Foreign Application Priority Data
Sep. 11, 2008   (DE) .................. 10 2008 046 781

(51) Int. Cl.
| | |
|---|---|
| *B32B 27/36* | (2006.01) |
| *B29D 7/01* | (2006.01) |
| *B32B 37/15* | (2006.01) |
| *B32B 27/30* | (2006.01) |
| *B29C 55/12* | (2006.01) |
| *C08L 67/03* | (2006.01) |
| *C08G 63/183* | (2006.01) |
| *B32B 15/09* | (2006.01) |
| *B32B 27/20* | (2006.01) |
| *C08K 13/00* | (2006.01) |
| *C08J 5/18* | (2006.01) |

(52) U.S. Cl.
CPC . *B32B 27/36* (2013.01); *B29D 7/01* (2013.01); *C08J 2367/03* (2013.01); *B32B 37/153* (2013.01); *B32B 27/304* (2013.01); *B29C 55/12* (2013.01); *C08L 67/03* (2013.01); *C08G 63/183* (2013.01); *B32B 2250/03* (2013.01); *B32B 15/09* (2013.01); *B32B 2307/31* (2013.01); *B32B 27/20* (2013.01); *C08K 13/00* (2013.01); *C08J 5/18* (2013.01); *C08J 2367/00* (2013.01); *Y10S 428/91* (2013.01)

USPC ........... 428/336; 428/334; 428/339; 428/346; 428/347; 428/349; 428/323; 428/480; 428/483; 428/910; 264/173.11; 264/288.4; 264/290.2

(58) Field of Classification Search
None
See application file for complete search history.

(56) References Cited

U.S. PATENT DOCUMENTS

| | | | | |
|---|---|---|---|---|
| 5,059,470 | A | * | 10/1991 | Fukuda et al. ................. 428/142 |
| 5,202,025 | A | * | 4/1993 | Onishi et al. ............. 210/500.35 |
| 5,458,965 | A | * | 10/1995 | Yoshinaka et al. ............ 428/323 |
| 5,955,181 | A | * | 9/1999 | Peiffer et al. .................. 428/212 |
| 6,423,401 | B2 | * | 7/2002 | Peiffer et al. .................. 428/216 |
| 6,663,977 | B2 | * | 12/2003 | Kurian et al. .................. 428/480 |
| 6,797,359 | B2 | * | 9/2004 | Janssens et al. ............... 428/141 |
| 6,855,758 | B2 | * | 2/2005 | Murschall et al. ............. 524/195 |
| 6,902,802 | B2 | * | 6/2005 | Kurian et al. .................. 428/349 |
| 6,939,584 | B2 | * | 9/2005 | Sankey et al. ............... 427/393.5 |
| 7,141,293 | B2 | * | 11/2006 | Peiffer et al. .................. 428/141 |
| 7,368,165 | B2 | * | 5/2008 | Sankey et al. ................. 428/336 |
| 7,422,782 | B2 | * | 9/2008 | Haedt et al. ................... 428/41.7 |
| 8,202,612 | B2 | * | 6/2012 | Brennan et al. ............... 428/348 |
| 2002/0065346 | A1 | * | 5/2002 | Murschall et al. ............. 524/323 |
| 2003/0091843 | A1 | * | 5/2003 | Murschall et al. ............ 428/480 |

FOREIGN PATENT DOCUMENTS

| | | |
|---|---|---|
| EP | 0 035 835 A1 | 9/1981 |
| EP | 0 515 096 A2 | 11/1992 |
| EP | 6423401 B2 | 10/2001 |
| GB | 1 465 973 | 3/1977 |
| WO | 03/049472 A1 | 8/2001 |

* cited by examiner

Primary Examiner — Vivian Chen
(74) Attorney, Agent, or Firm — ProPat, L.L.C.

(57) ABSTRACT

The invention relates to a sealable, biaxially oriented polyester film comprising a base layer B, a sealable cover layer A, and a non-sealable cover layer C. The invention further relates to a method for producing the film and to the use thereof.

26 Claims, No Drawings

SEALABLE BIAXIALLY ORIENTED POLYESTER FILM

CROSS-REFERENCE TO RELATED APPLICATIONS

This application is being filed under Rule 1.371 as a National Stage Application of pending International Application No. PCT/EP2009/006385 filed Sep. 3, 2009, which claims priority to the following parent application: German Patent Application No. 10 2008 046 781.2, filed Sep. 11, 2008. Both International Application No. PCT/EP2009/006385 and German Patent Application No. 10 2008 046 781.2 are hereby incorporated by reference herein in their entirety.

FIELD OF THE INVENTION

The invention relates to a sealable biaxially oriented polyester film comprising a base layer B, a sealable top layer A and a nonsealable top layer C. The invention further relates to a process for producing the film and to the use thereof.

Sealable biaxially oriented polyester films are known.

BACKGROUND OF THE INVENTION

GB-A-1 465 973 ( whose United States equivalent is U.S. Pat. No. 3,871,947), describes a coextruded two-layer polyester film, of which one layer consists of isophthalic acid-and terephthalic acid-containing copolyesters and the other layer consists of polyethylene terephthalate. There is no useful information about the sealing behavior of the film in the document. Owing to lack of pigmentation, the film is not windable and not further processible.

EP-A-0 035 835 describes a coextruded sealable polyester film to which particles whose mean particle size exceeds the layer thickness of the sealing layer are added to improve the winding and processing performance in the sealing layer. The particulate additives form surface projections which prevent the undesired blocking and adhesion of the film to rollers or guides. It remains unclear whether the other, nonsealable layer of the film comprises antiblocking agents. The seal seam strength is measured at 140° C. and is within a range from 63 to 120 N/m (corresponding to 0.97 to 1.8 N/15 mm of film width).

EP-A-0 515 096 describes a coextruded multilayer sealable polyester film which comprises an additional additive on the sealable layer. The additive may comprise, for example, inorganic particles and is preferably applied as an aqueous layer to the film in the course of production thereof. This is intended to maintain the good sealing properties and ensure that the film has good processability. The reverse of the film contains only very few particles, which get into this layer principally via the regrind. There is no information in this document regarding the sealing temperature range of the film. The seal seam strength is measured at 140° C. and is more than 200 N/m (corresponding to 3 N/15 mm of film width). For a sealing layer of thickness 3 μm, a seal seam strength of 275 N/m (corresponding to 4.125 N/15 mm of film width) is reported.

EP-A-1 138 480, ( whose United States equivalent is U.S. Pat. No. 6,423,401B2), describes a biaxially oriented sealable polyester film with a base layer B, a sealable top layer A and a further, nonsealable top layer C. The sealable top layer A has a minimum sealing temperature of not more than 110° C. and a seal seam strength of at least 1.3 N/15 mm of film width. The topographies of the two top layers A and C are characterized by particular features. The inventive film is suitable particularly for use in flexible packages, and especially for use on high-speed packaging machines. This film can achieve only very low adhesion to PVC.

SUMMARY OF ADVANTAGEOUS EMBODIMENTS OF THE INVENTION

It was thus an object of the present invention to provide a sealable biaxially oriented polyester film which is notable especially for
- a low minimum sealing temperature, preferably of less than/equal to 105° C., and
- a high sealability to itself and substrates made of PVC or metal, preferably of greater than 2.0 N/15 mm to itself (FIN, measured at 140° C., 4 bar, 0.5 s), PVC and metal (measured at 180° C., 4 bar, 0.5 s).

It was a particular aim of the present invention to develop a film with a low minimum sealing temperature of less than/equal to 105° C. and good sealing to PVC films and metallic substrates (seal seam strength greater than 2 N/15 mm). In the course of production of the film, it should additionally be ensured that offcut material which occurs can be recycled back to the production process as regrind in an amount of up to 60% by weight, based on the total weight of the film, without this adversely affecting the physical and optical properties of the film.

DETAILED DESCRIPTION OF ADVANTAGEOUS EMBODIMENTS OF THE INVENTION

The object is achieved in accordance with the invention by the provision of a coextruded three-layer biaxially oriented sealable polyester film comprising a base layer B, a sealable top layer A and a top layer C, wherein
a) the minimum sealing temperature (FIN) is less than/equal to 105° C.,
b) the seal seam strength (FIN), measured at 140° C., 4 bar, 0.5 s, is greater than 2.0 N/15 mm,
c) the glass transition temperature of the main component of the top layer A is less than 70° C.,
d) the melting point of the main component of the top layer A is less than 220° C.,
e) the sealable top layer A has a thickness of 0.5 to 10.0 μm,
f) the sealable top layer A contains particles in a concentration in the range from 0 to 0.5% by weight (based on the weight of the top layer A),
g) the nonsealable top layer C contains particles in a concentration of more than 0.05% by weight (based on the weight of the top layer C).

According to the invention, the glass transition temperature of the main component of the top layer A is less than 70° C., preferably less than 60° C., more preferably less than 50° C. The top layer consists of this polymer in an amount of at least 70% by weight, preferably at least 80% by weight and more preferably at least 90% by weight. When the glass transition temperature of this polymer is greater than 70° C., the desired low minimum sealing temperature is not achieved.

The melting point of the main component of the top layer A is less than 220° C., preferably less than 200° C., more preferably less than 180° C. When the melting point of the main component is 220° C. or greater, the seal seam strength is insufficient.

The top layer A has a thickness of 0.5 to 10.0 μm, preferably 0.7 to 7.0 μm, more preferably 1.0 to 5.0 μm. When the thickness of the top layer is less than 0.5 μm, the seal seam strength is insufficient. In the case of top layers of greater than 10 μm, the winding performance of the film worsens.

The sealable top layer A contains particles in a concentration of 0 to 0.5% by weight, preferably of 0.01 to 0.4% by weight, more preferably of 0.02 to 0.3% by weight (based on the weight of the top layer A). When the top layer A contains more than 0.5% by weight of particles, the seal seam strength of the film is too low.

The nonsealable top layer C contains particles in a concentration of more than 0.05% by weight, preferably more than 0.10% by weight, more preferably more than 0.15% by weight. When the top layer C contains less than 0.05% by weight of particles, the winding performance of the film is poor. 'Nonsealable' means that the top layer C has poorer properties at least in one sealing property than the sealable top layer A, especially a minimum sealing temperature of greater than 200° C. (FIN).

The film has three layers and comprises the base layer B, the sealable top layer A and the nonsealable top layer C.

Polymers Used for the Base Layer (B)

The base layer B of the film preferably consists of a thermoplastic polyester to an extent of at least 90% by weight. Suitable thermoplastic polyesters for this purpose are polyesters formed from ethylene glycol and terephthalic acid (=polyethylene terephthalate, PET), formed from ethylene glycol and naphthalene-2,6-dicarboxylic acid (=polyethylene 2,6-naphthalate, PEN), formed from 1,4-bis(hydroxymethyl)cyclohexane and terephthalic acid [=poly(1,4-cyclohexanedimethylene terephthalate), PCDT], and formed from ethylene glycol, naphthalene-2,6-dicarboxylic acid and biphenyl-4,4'-dicarboxylic acid (=polyethylene 2,6-naphthalate bibenzoate, PENBB). Particular preference is given to polyesters which consist of ethylene glycol and terephthalic acid units or of ethylene glycol and naphthalene-2,6-dicarboxylic acid units to an extent of at least 90 mol %, preferably at least 95 mold. The remaining monomer units originate from other aliphatic, cycloaliphatic or aromatic diols or dicarboxylic acids.

Suitable other aliphatic diols are, for example, diethylene glycol, triethylene glycol, aliphatic glycols of the general formula HO—$(CH_2)_n$—OH where n is an integer from 3 to 6 (especially propane-1,3-diol, butane-1,4-diol, pentane-1,5-diol and hexane-1,6-diol), or branched aliphatic glycols having up to 6 carbon atoms (especially neopentyl glycol). Among the cycloaliphatic diols, mention should be made of cyclohexane diols (especially cyclohexane-1,4-diol). Suitable other aromatic diols correspond, for example, to the formula HO—$C_6H_4$—X—$C_6H_4$—OH where X is —$CH_2$—, —$C(CH_3)_2$—, —$C(CF_3)_2$—, —O—, —S— or —$SO_2$—. In addition, bisphenols of the formula HO—$C_6H_4$—$C_6H_4$—OH are also very suitable.

Other aromatic dicarboxylic acids are preferably benzenedicarboxylic acids, naphthalenedicarboxylic acids, for example naphthalene-1,4- or -1,6-dicarboxylic acid, biphenyl-x,x'-dicarboxylic acids, especially biphenyl-4,4'-dicarboxylic acid, diphenylacetylene-x,x'-dicarboxylic acids, especially diphenylacetylene-4,4'-dicarboxylic acid, or stilbene-x,x'-dicarboxylic acids. Among the cycloaliphatic dicarboxylic acids, mention should be made of cyclohexanedicarboxylic acids, especially cyclohexane-1,4-dicarboxylic acid. Among the aliphatic dicarboxylic acids, the ($C_3$ to $C_{19}$)-alkanedioic acids are particularly suitable, where the alkane moiety may be straight-chain or branched.

The polyesters can be prepared, for example, by the transesterification process. This proceeds from dicarboxylic esters and diols, which are reacted using the customary transesterification catalysts such as zinc salts, calcium salts, lithium salts, magnesium salts and manganese salts. The intermediates are then polycondensed in the presence of generally customary polycondensation catalysts such as antimony trioxide, titanium salts, germanium salts or aluminum salts. The preparation can equally be effected by the direct esterification process in the presence of polycondensation catalysts. This proceeds directly from the dicarboxylic acids and the diols.

Polymers for the Sealable Top Layer A:

The sealable top layer A applied to the base layer B by coextrusion consists to an extent of at least 70% by weight, preferably at least 80% by weight and more preferably at least 90% by weight of copolyesters which are composed predominantly of terephthalic acid units and of butane-1,4-diol and neopentyl glycol (2,2-dimethyl-1,3-dihydroxypropane) units. The remaining monomer units originate from other aliphatic, cycloaliphatic or aromatic diols or dicarboxylic acids, as can also occur in the base layer. The preferred copolyesters are those which are formed from ethylene terephthalate units and from butylene terephthalate and neopentylene terephthalate units. The proportion of butylene terephthalate is 40 to 90 mol % and the proportion of neopentylene terephthalate is 10 to 40 mol %. Preference is given to copolyesters in which the proportion of butylene terephthalate is 50 to 85 mol %, that of neopentylene terephthalate 10 to 35 mol % and that of ethylene glycol 0 to 15 mol %, and particular preference is given to copolyesters in which the proportion of butylene terephthalate is 60 to 80 mol %, that of neopentylene terephthalate 15 to 30 mol % and that of ethylene glycol 5 to 10 mol %.

Sealing Properties of the Sealable Top Layer A:

The desired sealing properties of the top layer A are obtained from the combination of the properties of the copolyester used, the top layer thickness and the particle content.

The sealable top layer A has a minimum sealing temperature to itself of less than 105° C., preferably less than 100° C. and more preferably less than 95° C. The seal seam strength (which is measured at 140° C., 4 bar, 0.5 s) is at least 2.0 N/15 mm, preferably 2.5 N/15 mm, more preferably 3.0 N/15 mm of film width.

According to the invention, the top layer (A) may comprise particles. Typical particles which are used in the top layers (A) are inorganic and/or organic particles, for example calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, calcium salts, barium salts, zinc salts or manganese salts of the dicarboxylic acids used, carbon black, titanium dioxide, kaolin or particulate polymers, for example crosslinked polystyrene or acrylate particles. The amount of particles is in the range from 0 to 0.5% by weight, preferably from 0.01 to 0.4% by weight, more preferably from 0.02 to 0.3% by weight (based on the weight of the top layer A). The $d_{50}$ of the particles is preferably between 1 and 10 μm.

Polymers for the Nonsealable Top Layer C:

For the other, nonsealable top layer C, it is possible in principle to use the same polymers as have already been described above for the base layer B. The minimum sealing temperature of this top layer C is preferably significantly above 200° C.

To improve the winding performance and the processability, the top layer C comprises inert particles. The concentration of the inert particles in the top layer C is more than 0.05% by weight, preferably more than 0.10% by weight and more preferably more than 0.15% by weight, and is guided essentially by the optical properties of the film to be achieved.

The polyester film may be transparent, white, opaque, glossy or matt. These different optical properties are achieved, for example, by the addition of different amounts of additives such as barium sulfate, calcium carbonate, amorphous silica or titanium dioxide in different mean particle sizes ($d_{50}$). These additives may be present both in the base layer and in the top layers A and C.

All layers may additionally comprise customary additives, for example UV stabilizers, flame retardants or hydrolysis stabilizers. These additives are appropriately added to the polymer or to the polymer mixture before the melting.

In the film, the thickness of the sealable top layer A is in the range from 0.5 to 10.0 μm, preferably in the range from 0.7 to 7.0 μm, more preferably in the range from 1.0 to 5.0 μm.

coating on the nonsealable side of the film can be used, for example, as an adhesion promoter for printing inks.

The inventive film is notable for an outstanding seal seam strength and a low minimum sealing temperature. The sealable top layer A seals to itself, or to PET, PVC or metal (e.g. aluminum or ECCS steel).

In the course of production of the film, it is guaranteed that the offcut material (regrind) can be fed back to the extrusion in an amount of up to 60% by weight, based on the total weight of the film, without this significantly adversely affecting the physical properties of the film.

Properties

The table below (Table 1) summarizes the most important film properties once again at a glance:

TABLE 1

| Property | Appropriate range | Preferred | More preferred | Unit | Test method/comment |
|---|---|---|---|---|---|
| Minimum sealing temperature (FIN) | <105 | <100 | <95 | ° C. | 4 bar, 0.5 s |
| Seal seam strength (FIN) | >2.0 | >2.5 | >3.0 | N/15 mm | DIN 55529, 140 ° C., 4 bar, 0.5 s |
| Glass transition temperature of the polymer of the top layer A | <70 | <60 | <50 | ° C. | DSC |
| Melting point of the polymer of the top layer A | <220 | <200 | <180 | ° C. | DSC |
| Thickness of the top layer A | 0.5-10.0 | 0.7-7.0 | 1.0-5.0 | μm | |
| Particle content of the top layer A | 0-0.5 | 0.01-0.4 | 0.02-0.3 | % by wt | |
| Particle content of the top layer C | >0.05 | >0.10 | >0.15 | % by wt | |

The total thickness of the inventive polyester film may vary within particular limits. It is preferably 10 to 125 μm, more preferably 12 to 100 μm, the layer B having a proportion of preferably 30 to 90% of the total thickness.

The production process for polyester films is described, for example, in the "Handbook of Thermoplastic Polyesters, Ed. S. Fakirov, Wiley-VCH, 2002" or in the chapter "Polyesters, Films" in the "Encyclopedia of Polymer Science and Engineering, Vol. 12, John Wiley & Sons, 1988". In the preferred extrusion process for producing the film, the molten polymer material, if appropriate with the additives, is extruded through a slot die and quenched on a chill roll as substantially amorphous preliminary film. This film is then reheated and stretched ("oriented") in at least one direction—either in machine direction (MD) or in transverse direction (TD)—, but preferably in longitudinal and transverse direction or in transverse and longitudinal direction or in longitudinal, in transverse and once again in longitudinal and/or transverse direction. The film temperatures in the stretching process are generally 10 to 60° C. above the glass transition temperature Tg of the polyester used, the stretching ratio of the longitudinal stretching is typically 2.0 to 6.0, especially 3.0 to 4.5, that of the transverse stretching 2.0 to 5.0, especially 3.0 to 4.5, and that of any second longitudinal and transverse stretching performed 1.1 to 5.0. The longitudinal stretching can also be performed simultaneously with the transverse stretching (simultaneous stretching) or in any conceivable sequence. This is followed by the heatsetting of the film at oven temperatures of 180 to 260° C., especially of 220 to 250° C. The film is subsequently cooled and wound up.

Optionally, the film, before the transverse stretching, can be coated in-line by the known methods, for example by means of Meyer rod or by reverse gravure roll coating. A To characterize the raw materials and the films, the following test methods were used in the context of the present invention:

Seal Seam Strength (DIN 55529)

To determine the seal seam strength of the film to itself, the sealing layers of two 15 mm-wide film strips of the inventive film are placed one on top of another and pressed together at 140° C. for a time of 0.5 s and at a pressure of 4 bar (equipment: Brugger NDS, sealing jaw heated on one side). The seal seam strength (maximum force) is determined at a peel angle of 90° (90° peel method).

To determine the seal seam strength of the film to PVC, the amorphous side of a 15 mm-wide film strip is placed onto a strip of PVC of equal size. In a modification of the above-described method, a temperature of 180° C. is used. Owing to the stiffness of the substrate, the seal seam strength (maximum force) is determined at a peel angle of 180°.

Determination of the Minimum Sealing Temperature

The Brugger HSG/ET sealing machine is used, as described above in the measurement of seal seam strength, to produce heatsealed samples (seal seam 15 mm×100 mm). The seal seam strength is measured for various temperatures. The minimum sealing temperature is the temperature at which a seal seam strength of at least 1.0 N/15 mm is achieved.

Glass Transition Temperature and Melting Point

The glass transition temperature and the melting point of the polyester of the top layer A are determined with a DSC instrument (Perkin-Elmer Pyris 1) (DIN 53765). The sample is heated to 300° C. at 20 K/min and kept at this temperature for 10 min. Thereafter, the sample is cooled to 20° C. as rapidly as possible (500 K/min). The sample is kept at 20° C. for 10 min and heated to 300° C. at 20 K/min. In order to achieve better reproducibility, the values of the second heating are used.

Haze

The haze is determined to ASTM D 1003-52.

SV (Standard Viscosity)

The standard viscosity SV (DCA) is, on the basis of DIN 53726, measured at 25° C. in dichloroacetic acid, in a departure from the standard. The intrinsic viscosity (IV) of polyethylene terephthalate is calculated as follows from the standard viscosity:

$$IV=[\eta]=6.907*10^{-4}SV(DCA)+0.063096 \text{ [dl/g]}$$

The invention is illustrated in detail hereinafter using examples.

Example 1

To produce the film described below, the following starting materials were used:

Top Layer (A):
100% by weight of copolyester formed from 70 mol % of butylene terephthalate, 25 mol % of neopentylene terephthalate and 5 mol % of ethylene terephthalate with a SV of 950 and a glass transition temperature of 43° C.

Base Layer (B):
100% by weight of polyethylene terephthalate with a SV of 800

Top layer (C), mixture of:
80% by weight of polyethylene terephthalate with a SV of 800
20% by weight of masterbatch composed of 99% by weight of polyethylene terephthalate (SV of 800) and 1% by weight of SYLOBLOC® 44H (synthetic $SiO_2$ from Grace, $d_{50}$: 2.5 μm)

The abovementioned raw materials were melted in one extruder each per layer and extruded through a three-layer slot die onto a cooled draw roll. The amorphous preliminary film thus obtained was then stretched first longitudinally and then transversely, heatset and rolled up (final thickness of the film 12 μm, top layers 1 μm each). The conditions in the individual process steps were:

| Longitudinal stretching: | Temperature: | 80-120° C. |
|---|---|---|
| Transverse stretching: | Longitudinal stretching ratio: | 4.0 |
| | Temperature: | 80-135° C. |
| | Transverse stretching ratio: | 4.2 |
| Heatsetting: | | 2 s at 235° C. |

The properties of the film thus obtained are reproduced in Table 2.

Example 2

Compared to example 1, the film thickness was raised to 20 μm and the top layer thickness of the sealable layer A to 2.0 μm with otherwise identical film structure and identical method of preparation. The sealing properties have improved as a result; more particularly, the seal seam strength has become significantly greater.

Example 3

Compared to example 1, the composition of the top layer (A) was altered:

Top layer (A):
95% by weight of copolyester formed from 70 mol % of butylene terephthalate, 25 mol % of neopentylene terephthalate and 5 mol % of ethylene terephthalate with a SV of 950
5% by weight of masterbatch composed of 95% by weight of copolyester (SV of 850) formed from 82 mol % of ethylene terephthalate and 18 mol % of ethylene isophthalate, and 5% by weight of SYLYSIA® 430 (synthetic $SiO_2$ from Fuji, Japan, $d_{50}$: 3.4 μm)

The winding performance of the film has improved.

Comparative Example 1

Compared to example 1, the composition of the top layer (A) was altered (analogously to EP-B-0 035 835, example 1); the thickness of the film was 15 μm, that of the top layer (A) 2.25 μm:

Top layer (A):
95% by weight of copolyester formed from 82 mol % of ethylene terephthalate and 18 mol % of ethylene isophthalate with a SV of 850
5% by weight of masterbatch composed of 95% by weight of copolyester (SV of 850) formed from 82 mol % of ethylene terephthalate and 18 mol % of ethylene isophthalate, and 5% by weight of SYLYSIA® 430 (synthetic $SiO_2$ from Fuji, Japan, $d_{50}$: 3.4 μm)

TABLE 2

| | E1 | E2 | E3 | C1 |
|---|---|---|---|---|
| Film thickness (μm) | 12 | 20 | 12 | 15 |
| Thickness of the top layers A (μm) | 1.0 | 2.0 | 1.0 | 2.25 |
| Particle content of the top layers A (%) | 0 | 0 | 0.25 | 0.25 |
| Minimum sealing temperature (FIN) | 93 | 92 | 95 | 112 |
| Seal seam strength (FIN) | 3.2 | 4.2 | 3.0 | 3.8 |
| Seal seam strength to PVC (N/15 mm) | 5.7 | 7.1 | 5.2 | 0.4 |
| Haze (%) | 1.9 | 2.1 | 2.2 | 2.0 |

The invention claimed is:

1. A coextruded at least three-layer biaxially oriented polyester film comprising a base layer B, a top layer A on one side of the base layer B and a top layer C on the other side of the base layer B opposite the top layer A, wherein
   a) the film has a minimum sealing temperature, based on FIN=top layer A to top layer A sealing, of less than/equal to 105° C.,
   b) the film has a seal seam strength, based on FIN sealing, measured at 140° C., 4 bar, 0.5 s, of greater than 2.0 N/15 mm,
   c) the top layer A comprises a polymeric main component having a glass transition temperature of less than 70° C.,
   d) the polymeric main component of the top layer A has a melting point of less than 220 C.,
   e) the top layer A has a thickness of 0.5 to 10.0 μm,
   f) the top layer A contains particles in a concentration in the range from 0 to 0.5% by weight, based on the weight of the top layer A,
   g) the top layer C contains particles in a concentration of more than 0.05 % by weight, based on the weight of the top layer C,
   wherein said polymeric main component of top layer A is a copolyester comprising 1,4-butylene tereplathalate in a proportion ranging from 50 to 85 mol %, neopentylene terephthalate in a proportion ranging from 10 to 35 mol %, and ethylene terephthalate in a proportion ranging from 0 to 15 mol %.

2. The polyester film as claimed in claim 1, wherein the glass transition temperature of the polymeric main component of the top layer A is less than 60° C.

3. The polyester film as claimed in claim 1, wherein the polymeric main component of the top layer A is present in said top layer A in an amount of at least 70% by weight, based on the mass of the top layer A.

4. The polyester film as claimed in claim 3, wherein the polymeric main component of the top layer A is present in this top layer in an amount of at least 80% by weight, based on the mass of the top layer A.

5. The polyester film as claimed in claim 3, wherein the polymeric main component of the top layer A is present in this top layer in an amount of at least 90% by weight, based on the mass of the top layer A.

6. The polyester film as claimed in claim 1, wherein the melting point of the polymeric main component of the top layer A is less than 200° C.

7. The polyester film as claimed in claim 6, wherein the melting point of the polymeric, main component of the top layer A is less than 180° C.

8. The polyester film as claimed in claim 1, wherein the top layer A has a thickness of 0.7 to 7.0 μm.

9. The polyester film as claimed in claim 8, wherein the top layer A has a thickness of 1.0 to 5.0 μm.

10. The polyester film as claimed in claim 1, wherein the sealable top layer A contains particles in a concentration of 0.01 to 0.4% by weight, based on the weight of the top layer A.

11. The polyester film as claimed in claim 10, wherein the sealable top layer A contains particles in a concentration of 0.02 to 0.3 by weight, based on the weight of the top layer A.

12. The polyester film as claimed in claim 1, wherein the top layer C contains particles in a concentration of more than 0.10% by weight.

13. The polyester film as claimed in claim 12, wherein the top layer C contains particles in a concentration of more than 0.15 by weight.

14. The polyester film as claimed in claim 1, wherein the film has three layers and comprises the base layer B, the top layer A and the top layer C.

15. The polyester film as claimed in claim 1, wherein the top layer A has a minimum sealing temperature to itself, based on FIN scaling, of less than 100° C.

16. The polyester film as claimed in claim 15, wherein the top layer A has a minimum sealing temperature to itself, based on FIN sealing, of less than 95° C.

17. The polyester film as claimed in claim 1, wherein the seal seam strength in the case of FIN sealing of top layer A to top layer A, measured at 140° C., 4 bar, 0.5 s, is at least 2.5 N/15 mm of film width.

18. The polyester film as claimed in claim 17, wherein the seal seam strength m the case of FIN sealing of top layer A to top layer A. measured at 140° C. 4 bar, 0.5 s, is at least 3.0 N/15 mm of film width.

19. A process for producing a film as claimed in claim 1, comprisina coextruding melts corresponding to the individual layers A, B and C of the film through a flat die,
consolidating the film thus obtained by drawing it of on one or more rolls,
biaxially stretching the consolidated film and
heat setting and rolling up the biaxially stretched film,
wherein the glass transition temperature of the polymeric main component of the top layer A is less than 70° C., the melting point of the polymeric main component of the top layer A is less than 220° C., the top layer A has a thickness of 0.5 to 10.0 μm, the top layer A contains particles in a concentration in the range from 0 to 0.5% by weight, based on the weight of the top layer A, and the top layer C contains particles in a concentration of more than 0.05 by weight, based on the weight of the top layer C.

20. A packaging film or laminating film comprising a polyester film as claimed in claim 1.

21. The packaging film or laminating film as claimed in claim 20, wherein said film is sealed to PVC films or metallic substrates.

22. The polyester film as claimed in claim 1, wherein the proportion of 1,4-butylene terephthalate is 60 to 80 mol %, the proportion of neopentylene terephthalate is 15 to 30 mol %, and the proportion of ethylene terephthalate is 5 to 10 mol %.

23. A coextruded at least three-layer biaxially oriented polyester film comprising a base layer B, a top layer A on one side of the base layer B and a top layer C on the other side of the base layer B opposite the top layer A, wherein
  a) the top layer A has a thickness of 0.5 to 10.0 μm,
  b) the top layer A contains particles in a concentration in the range from 0 to 0.5% by weight, based on the weight of the top layer A,
  c) the top layer C contains particles in a concentration of more than 0.05% by weight, based on the weight of the top layer C, and
  d) the film has a seal seam strength, based on FIN sealing, measured at 140° C., 4 bar, 0.5 s, of greater than 2.0 N/15 mm,
  wherein the top layer A is sealable and comprises at least 70 by weight of copolyester comprising carboxylic acid consisting of terephthalic acid, ethylene glycol in an amount ranging from 0 to 15%, butane-1,4-diol and neopentyl glycol units,
  the terephthalic acid units and butane-1,4-diol form 1,4-butylene terephthalate and the terephthalic acid units and neopentvl glycol form neopentylene terenhthalate, said 1,4-butylene terephthalate present in the copolyester in a proportion of from 40 to 90 mol % and the neopentylene terephthalate present in the copolyester in a pronortion of from 10 to 40 mol %.

24. The polyester film as claimed in claim 23, wherein the glass transition temperature of the polymeric main component of the top layer A is less than 50° C.

25. The polyester film as claimed in claim 23, wherein the sealable top layer A comprises at least 80% by weight of said copolyester.

26. The polyester film as claimed in claim 23, wherein the sealable top layer A comprises at least 90% by weight of said copolyester.

* * * * *

UNITED STATES PATENT AND TRADEMARK OFFICE
CERTIFICATE OF CORRECTION

PATENT NO.         : 8,986,830 B2
APPLICATION NO.    : 13/062706
DATED              : March 24, 2015
INVENTOR(S)        : Konrad et al.

It is certified that error appears in the above-identified patent and that said Letters Patent is hereby corrected as shown below:

Claims

Column 8
Claim 1, Line 54, delete "220 C.," insert --220° C.,--

Column 9
Claim 11, Line 33, insert --%-- after 0.02 to 0.3
Claim 13, Line 39, insert --%-- after 0.15
Claim 18, Line 54, delete "m" insert --in--
Claim 18, Line 55, delete "A." insert --A,--
Claim 18, Line 55, delete "C. 4 bar," insert --C., 4 bar,--
Claim 19, Line 58, "comprisina" should be changed to --comprising--

Column 10
Claim 19, Line 1, delete "of" insert --off--
Claim 19, Line 12, insert --%-- after 0.05
Claim 23, Line 37, insert --%-- after 70
Claim 23, Line 44, "neopentvl" should be changed to --neopentyl--
Claim 23, Line 44, "terenhthalate" should be changed to --terenphthalate--
Claim 23, Line 48, "pronortion" should be changed to --proportion--

Signed and Sealed this
Eleventh Day of August, 2015

Michelle K. Lee
*Director of the United States Patent and Trademark Office*